United States Patent
Cote et al.

(10) Patent No.: US 7,182,954 B1
(45) Date of Patent: Feb. 27, 2007

(54) PREBIOTIC OLIGOSACCHARIDES VIA ALTERNANSUCRASE ACCEPTOR REACTIONS

(75) Inventors: Gregory L. Cote, Edwards, IL (US); Scott M. Holt, Macomb, IL (US)

(73) Assignees: The United States of America, as represented by the Secretary of Agriculture, Washington, DC (US); Board of Trustees of Western Illinois Univ., Macomb, IL (US)

( * ) Notice: Subject to any disclaimer, the term of this patent is extended or adjusted under 35 U.S.C. 154(b) by 442 days.

(21) Appl. No.: 10/407,668

(22) Filed: Apr. 4, 2003

(51) Int. Cl.
*A23K 1/16* (2006.01)

(52) U.S. Cl. .................. 424/442; 424/94.5; 435/193; 514/25; 514/35; 514/61

(58) Field of Classification Search ............ 424/94.5; 435/193–252.9; 514/25, 35, 61
See application file for complete search history.

(56) References Cited

U.S. PATENT DOCUMENTS

2005/0180962 A1* 8/2005 Raz et al. ................ 424/93.45

OTHER PUBLICATIONS

Cote & Robyt ;Acceptor reactions of Alternansucras-; Carbohydrate Research , 111 127-142, 1982.*

Cote et al Prebiotic Oligosaccharieds via Alternansucrase Acceptor Reactions; Abstraxct 223rd ACS national Meeting Apr. 7-11, 2000□□.*

Holt et al Utilization of Various Carbohydrates by Intestinal Bacteria; abstract of the General Meeting of American Society for Microbiology, May 19-23, 2002.*

* cited by examiner

*Primary Examiner*—Neil S. Levy
(74) *Attorney, Agent, or Firm*—John D. Fado; Randall E. Deck; Lesley Shaw

(57) ABSTRACT

Oligosaccharides produced by an alternansucrase enzyme catalyzed reaction of sucrose with an acceptor oligosaccharide are effective as prebiotics for controlling enteric bacterial pathogens. Populations of enteropathogenic bacteria may be substantially reduced or inhibited by treatment of an animal with a composition comprising one or more of these oligosaccharides in an amount effective to promote the growth of beneficial bacteria. The method is particularly effective for the control of *Salmonella* species, enteropathogenic *Escherichia coli*, and *Clostridia perfringens*.

10 Claims, 1 Drawing Sheet

PREBIOTIC OLIGOSACCHARIDES VIA ALTERNANSUCRASE ACCEPTOR REACTIONS

BACKGROUND OF THE INVENTION

1. Field of the Invention

This invention relates to a process for the control of enteric bacterial pathogens in animals using prebiotic oligosaccharides.

2. Description of the Prior Art

Despite the efforts of researchers and public health agencies, the incidence of human infections from enteropathogenic bacteria such as *Salmonella*, enteropathogenic *E. coli*, and *Campylobacter* has increased over the past 20 years. For example, the number of actual reported cases of human *Salmonella* infection exceeds 40,000 per year. However, the Centers for Disease Control estimates that the true incidence of human *Salmonella* infections in the U.S. each year may be as high as 2 to 4 million. The USDA Economic Research Service has recently reported that the annual cost of the food borne illnesses caused by six common bacterial pathogens, *Campylobacter* spp., *Clostridium perfringens*, *Escherichia coli* 0157:H7, *Listeria monocytogenes*, *Salmonella* spp., and *Staphylococcus aureus*, ranges from 2.9 billion to 6.7 billion dollars (Food Institute Report, USDA, AER, December, 1996). In addition to the impact of enteric pathogens on human health, many of these bacteria also cause significant infections in animals. For example, *Salmonella* infections in swine alone cost the United States swine industry more than 100 million dollars annually (Schwartz, 1990, "Salmonellosis in Midwestern Swine", In: Proceedings of the United States Animal Health Assoc., pp. 443–449).

Animal food products remain a significant source of human infection by these pathogens. Contamination of meat and poultry with many bacterial food-borne pathogens, including the particularly onerous pathogens *Campylobacter* spp., *Escherichia coli* 0157:H7, and *Salmonella* spp., often occurs as a result of exposure of the animal carcass to ingesta and/or fecal material during or after slaughter. Any of the above-mentioned pathogens can then be transmitted to humans by consumption of meat and poultry contaminated in this manner.

Preharvest control of enteropathogenic bacteria is a high priority to the food industry. However, relatively few products have been developed to facilitate such efforts. One promising technique for preharvest pathogen control within the poultry industry has been the use of competitive exclusion cultures or probiotics (broadly defined as bacterial cultures which have a beneficial effect on the animal to which they are administered). Studies have typically focused on the evaluation of vaccines, establishment of protective normal intestinal flora, and the identification of feed additives that will inhibit the growth and colonization of enteropathogens such as *Salmonella*.

It is well documented that the development of a normal intestinal microflora can increase resistance against *Salmonella* colonization of the gastrointestinal tract. In the poultry industry, oral inoculation of young chicks with probiotics which comprise anaerobic bacterial cultures of microflora prepared from the cecal contents or fecal droppings of mature chickens, has proven to effectively reduce *Salmonella* colonization (Snoeyenbos et al., *Avian Dis.*, 1979, 23:904–913; Schneitz et al., *Acta Pathol. Microbiol. Scand. Sect. B.*, 1981, 89:109–116; and Stavric et al., *J. Food Prot.*, 1985, 48:778–782). These probiotics may decrease *Salmonella* colonization by rapidly colonizing the intestinal tract of the young chicks (Pivnick et al., *J. Food Prot.*, 1981, 44:909–916), by competing for attachment sites on the intestinal wall (Snoeyenbos et al., ibid), or by producing bacteriostatic or bactericidal short-chained volatile fatty acids that inhibit the growth of enteropathogens (Barnes et al., *J. Hyg. Camb.*, 1979, 82:263–283; Barnes et al., *Am. J. Clin. Nutr.*, 1980, 33:2426–2433; Corrier et al., *Avian Dis.*, 1990, 34:668–676; Corrier et al., *Avian Dis.*, 1990, 34:617–625; and Hinton et al., *Avian Dis.*, 1990, 34:626–633). Effective probiotics have been successfully developed for fowl and swine. For instance, Nisbet et al. of the USDA Agricultural Research Service, has developed a defined probiotic which is effective for controlling *Salmonella* colonization of swine (U.S. Pat. No. 5,951,977). Another probiotic has also developed by Nisbet et al. for the protection of fowl from *Salmonella* colonization (U.S. Pat. No. 5,478,557), and is sold commercially in the U.S. under the trademark PREEMPT (Milk Specialties Biosciences, Dundee, Ill.).

Immune lymphokines (ILK) have also been developed for protecting poultry from colonization with enteric pathogens as described by Ziprin et al. (1989, Poult. Sci., 68:1637–1642), McGruder et al. (1993, Poult. Sci., 72:2264–2271), Ziprin et al. (1996, Avian Dis., 40:186–192), and Tellez et al. (1993, Avian Dis., 37:1062–1070), and more recently by Kogut et al. (U.S. Pat. Nos. 5,891,443 and 5,691,200). Most recently, Anderson et al. (U.S. Pat. No. 6,475,527) disclosed that chlorates substantially reduce populations of enteropathogenic bacteria in the alimentary tract when administered orally, or alternatively, reduce the populations of these enteropathogens present as contaminants on the surface of the animals following external application of chlorates.

Several oligosaccharides have been described as having prebiotic activity in foods, animal feeds, and cosmetics. Like the above-mentioned probiotics, prebiotics also control enteropathogens by facilitating the establishment of protective normal intestinal flora. However, in contrast with the probiotics which consist of viable microorganisms, the prebiotics are oligosaccharides which assist the establishment of populations of the normal protective flora but not enteropathogenic bacteria by providing a substrate which may be readily utilized by beneficial bacteria but not by the enteropathogens. Glucooligosaccharides exhibit certain desirable characteristics in these applications, particularly in their ability to support the growth of beneficial probiotic normal flora bacteria without the generation of undesirable amounts of gases (Valette et al., *Sci. Food Agric.*, 1993, 62:121–127). Besides maltooligosaccharides, other glucooligosaccharides include isomaltooligosaccharides, kojioligosaccharides, and mixtures of variously linked saccharides (Yatake, In *Oligosaccharides. Production, Properties and Applications*; Nakakuki Ed.; Japanese Technology Reviews, Section E: Biotechnology, Vol. 3, No. 2; Gordon and Breach Science Publishers, Yverdon, Switzerland, 1993, pp. 79–89).

One group of glucooligosaccharides that is garnering an increasing amount of interest includes those synthesized from sucrose via glucansucrases (Castillo et al., *Ann. NY Acad. Sci.*, 1992, 672:425–430). Glucansucrases are typically extracellular enzymes secreted by bacteria such as *Streptococcus*, *Lactobacillus*, and *Leuconostoc* spp. They act by transferring D-glucosyl units from sucrose to D-glucose polymers, with the concomitant release of D-fructose. Glucansucrases, including dextransucrase and alternansucrase, have been reviewed in detail (Robyt, *Adv. Carbohydr. Chem. Biochem.*, 1995, 51:133–168; Robyt, In *Enzymes for Carbohydrate Engineering*, Park, Robyt, and Choi Eds, Elsevier Sciences, Amsterdam, 1996, pp. 1–22; Monchois et al., *FEMS Microbiol. Rev.*, 1999, 23:131–151; Remaud-Simeon et al., *J. Molec. Catalysis B: Enzymatic*, 2000, 10:117–128; and Côté, In *Biopolymers*, Vol. 5: *Polysaccharides I: Polysaccharides from Prokaryotes*, Vandamme, DeBaets, and Steinbüchel Eds., Wiley-VCH, Weinheim, Germany, 2002, pp. 323–350).

of particular interest are the so-called acceptor reactions of glucansucrases. In an acceptor reaction, D-glucosyl units are transferred from sucrose to a hydroxyl-bearing acceptor molecule, resulting in the formation of an α-D-glucopyranosyl acceptor product. Most known acceptors are carbohydrates, although non-carbohydrate acceptors have been described. Alternansucrase, in particular, is known for its ability to catalyze a wide variety of acceptor reactions with various sugars. Unlike dextransucrase (Robyt and Eklund, Carbohydr. Res., 1983, 121:279–286; and Yamauchi and Ohwada, *Agric. Biol. Chem.*, 1969, 33:1295–1300), alternansucrase often forms two or more linkage types with a single acceptor (Castillo et al., ibid; Côté and Robyt, *Carbohydr. Res.*, 1982, 111:127–142; and Pelenc et al., *Sciences des Aliments*, 1991, 11:465–476). It has also been noted that alternansucrase carries out acceptor reactions with a wider variety of acceptors with greater yields (Argüello-Morales et al., *Carbohydr. Res.*, 2001, 331:403–411).

However, despite these and other advances, the need persists for technologies for controlling enteric pathogens in animals.

SUMMARY OF THE INVENTION

We have now discovered that oligosaccharides produced by an alternansucrase enzyme catalyzed reaction of sucrose with an acceptor oligosaccharide are effective as prebiotics for controlling enteric bacterial pathogens. Populations of enteropathogenic bacteria may be substantially reduced or inhibited by treatment of an animal with a composition comprising one or more of these oligosaccharides in an amount effective to promote the growth of beneficial bacteria. The method is particularly effective for the control of *Salmonella* species, enteropathogenic *Escherichia coli*, and *Clostridia perfringens*.

In accordance with this discovery, it is an object of this invention to provide a method for controlling enteropathogenic bacteria in animals.

Another an object of this invention to provide a method for controlling colonization of the gastrointestinal tract of animals by enteropathogenic bacteria.

Yet another object of this invention is to provide a method for promoting the growth and establishment of populations of beneficial bacteria in the gastrointestinal tract of animals.

Still another objective is to provide a method for significantly reducing the populations of enteropathogenic bacteria in meat producing animals.

Other objectives and advantages of this invention will become readily apparent from the ensuing description.

DETAILED DESCRIPTION OF THE INVENTION

Figure 1:
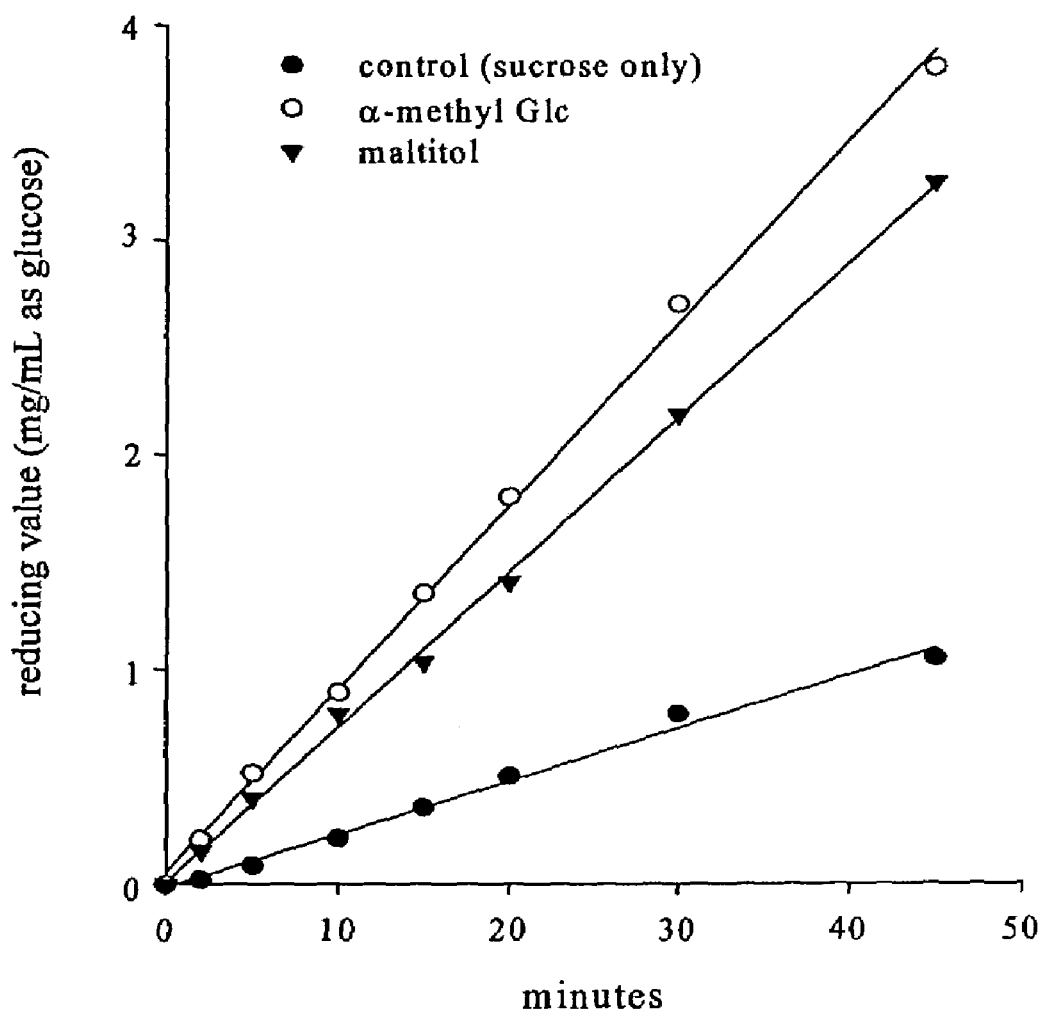
FIG. 1 shows the activation of alternansucrase by acceptors. Rates of release of reducing sugar from sucrose in the presence and absence of nonreducing acceptors. Conditions: 0.9 mL 10% (w/v) sucrose, 0.9 mL 10% (w/v) acceptor or buffer, and 0.2 mL alternansucrase, 1.5 U/mL, all in 20 mM pH 5.4 sodium acetate buffer at 25° C. Reactions were terminated by dilution in 10 volumes of 0.5 M sodium carbonate, and assayed for reducing sugar as described in the example.

Oligosaccharides suitable for use in the control of enteropathogenic bacteria as described herein are produced by the alternansucrase catalyzed transfer of one or more D-glucosyl moieties from sucrose to an acceptor oligosaccharide. A variety of acceptor oligosaccharides are suitable for use herein, although gentiobiose, raffinose, melibiose, maltitol, theanderose, kojibiose, glucosyl trehaloses, or mixtures thereof are preferred. Depending upon the particular substrate selected, the glucosyl units will generally be added through an α(1,6) linkage, or through an α(1,3) linkage if an α(1,6) linkage is already present. However, in some instances, such as the reaction with raffinose as the acceptor, the glucosyl units may be added through an α(1,3) or α(1,4) linkage. The reaction will typically produce a mixture of oligosaccharides having different degrees of polymerization or dp, defined as the number of D-glucosyl units added onto the original acceptor molecule plus the number of monosaccharide units in the original acceptor oligosaccharide. In the preferred embodiment, prebiotic oligosaccharides include those oligosaccharides having a degree of polymerization greater than or equal to 3, and preferably includes a mixture of oligosaccharides having a degree of polymerization of at least 3, 4, and 5, more preferably mixture oligosaccharides having a degree of polymerization of 3, 4, 5, and 6, and most preferably mixture oligosaccharides having a degree of polymerization of 3, 4, 5, 6, 7 and above. As will be discussed in greater detail hereinbelow, the extent of the degree of polymerization depends upon the concentrations of sucrose and acceptor, and particularly their relative ratio.

The oligosaccharides of the invention are effective as prebiotics, defined herein as compounds which support growth (i.e., serve as growth substrates) of beneficial intestinal microflora, including *Lactobacillus* species and *Bifidobacterium* species, but which either do not support growth of one or more species of enteropathogenic bacteria or only support the growth of such enteropathogenic bacteria at a rate which is substantially lower than the rate of growth of the above-mentioned beneficial bacteria on the same oligosaccharide. Enteropathogenic bacteria which may be controlled with the prebiotic oligosaccharides include but are not limited to *Salmonella* species, enteropathogenic *Escherichia coli* (including enterohemorrhagic strains, such as *E. coli* 0157:H7), and *Clostridium perfringens*. These prebiotic oligosaccharides control the growth of enteropathogenic bacteria by providing a substrate which is readily utilized by beneficial, non-pathogenic bacteria but not by the enteropathogens, thereby promoting the establishment of populations of the normal protective flora in or on the treated animal which prevent or inhibit colonization by enteropathogenic bacteria. While the oligosaccharides of the invention have been demonstrated to support the growth of many beneficial, normal flora bacteria, such as species of *Bifidobacterium* and *Lactobacillus*, it is envisioned that the compounds will also support the growth of other beneficial bacteria, including but not limited to, *Bacteroides* species and various enterococci. In contrast, the oligosaccharides are not effective for supporting a substantial rate of growth of one or more species of enteropathogenic bacteria, particularly, *Salmonella* species, enteropathogenic *Escherichia coli*, and *Clostridia perfringens*. Depending upon the particular enteropathogen, the oligosaccharides are either not utilized by the pathogens, or they are only poorly utilized by the pathogens in comparison to the beneficial bacteria.

Preparation of the prebiotic oligosaccharides is effected by reaction of sucrose with an acceptor oligosaccharide in the presence of a catalytically effective amount of the enzyme alternansucrase using techniques as described, for example, in Cote and Robyt 1982, *Carbohydrate Research*, 111:127–142, the contents of which are incorporated by reference herein). In the preferred embodiment, the reactions may be conducted at or near room temperature at a pH between about 5 and 6, and may be allowed to proceed until the sucrose has been consumed. As starting materials in the reaction, either or both of sucrose or the acceptor oligosaccharides may be provided in substantially pure form or, in the alternative, in impure form. For instance, cotton meal extract may be used as a source of raffinose. The practitioner skilled in the art will of course recognize that for products requiring a high degree of purity, use of substantially pure starting materials may be preferred. As noted above, a variety of acceptor oligosaccharides may be used, although use of one or more of gentiobiose, raffinose, melibiose, maltitol, theanderose, kojibiose, or glucosyl trehaloses, is preferred, with gentiobiose, raffinose, melibiose, or maltitol being particularly preferred.

Alternansucrase for use herein may be obtained from a variety of microorganisms, preferably strains of *Leuconostoc* and particularly strains of *L. mesenteroides*. In the preferred embodiment, the enzyme is produced by strains of which secrete a high proportion of alternansucrase to dextransucrase such as described by Leathers et al. (U.S. Pat. No. 5,702,942, the contents of which are incorporated by reference herein). Production of the alternansucrase may be conducted by culture of any of the above-mentioned microorganisms using conventional techniques and under aerobic conditions which are effective to promote growth and production of the enzyme such as described in Leathers et al. (ibid) or the examples hereinbelow. Following culture, the enzyme may be isolated or separated from the microorganisms using conventional techniques, such as by centrifugation or filtration. As a practical matter, it is envisioned that commercial formulations of the enzyme may be prepared directly from liquid culture medium from which cells have been removed in this manner, thereby obviating the need for further purification.

As mentioned above, the extent of the degree of polymerization may vary with the concentrations and the relative ratio of sucrose and acceptor oligosaccharide. The reaction product will generally be composed of a mixture of oligosaccharides having different degrees of polymerization. At a relatively high sucrose:acceptor ratio, more glucosyl units are transferred into glucan and higher degree of polymerization acceptor products (i.e., the product will be composed of a mixture of oligosaccharides ranging from low to high degree of polymerization, although the relative amounts of the high dp oligosaccharides will be increased). In contrast, at a low sucrose:acceptor ratio, the predominant reaction product is that resulting from the transfer of a single glucosyl unit to the acceptor. Thus, the yields of oligosaccharides of a desired degree of polymerization may be optimized by varying the sucrose:acceptor ratio. The precise sucrose:acceptor ratios for a desired degree of polymerization will vary with the particular acceptor oligosaccharide and may be readily determined by routine experimentation.

Following completion of the reaction the oligosaccharide products may be recovered for use as described hereinbelow. The oligosaccharide products may be used in impure form, or they may be separated or purified, such as by chromatography or nanofiltration. However, in the preferred embodiment, the crude reaction product may be used directly, thereby obviating the need for further purification.

Depending upon the route of treatment, the prebiotic oligosacdharides are effective for reducing the populations of the enteropathogenic bacteria within the gastrointestinal tract of animals when administered orally, or for reducing the populations of these bacteria which may be present as contaminants on the surfaces of the animal when applied externally. The process may be used for the treatment of a wide variety of animals, including primates, humans, equine, and meat producing animals such as fowl, ovine, bovine, and porcine. However, without being limited thereto, the oral applications are preferably used for the treatment of primates, humans, equine, and meat-producing, non-ruminant animals, such as fowl and porcine, and particularly chickens, turkeys, ducks, quail, geese, and pigs.

In a first preferred embodiment, the prebiotic oligosaccharides are administered orally to the subject animal for reducing populations of the enteropathogenic bacteria in the gastrointestinal tract. Typically, the compounds will be introduced into the alimentary tract by combining with the animal's feed or water, followed by oral ingestion thereof. However, it is also understood that the compounds may be administered separately or in combination with other conventional treatments.

In an alternative preferred embodiment, the prebiotic oligosaccharides are applied aerobically onto the outer surfaces of the animals for reducing populations of the enteropathogenic bacteria on its surface. In this embodiment, the compounds may be formulated with any suitable inert carrier. For instance, without being limited thereto, the compounds may be formulated with any conventional cosmetic base, lotion, or cream, or any pharmaceutical carrier used for human or animal skin or hide applications. Alternatively, it is also envisioned that the compounds may be applied as a spray on the animal, although they may also be applied using other techniques such as dipping, or dusting. It is generally recognized that the hides, feathers, hair, feet and/or hoofs of meat producing animals often become contaminated with fecal material, and may subsequently serve as sources for contamination of enteropathogenic bacteria inside the slaughterhouse. As such, the prevention of colonization of the exterior of the animal may prevent or reduce the subsequent contamination of animal carcasses in the slaughterhouse.

Treatment with the prebiotic oligosaccharides may occur at any time during the life of the animal. In a preferred embodiment, the compounds are administered to newborn and/or young animals. As a practical matter, greater control, that is, a further reduction in the populations of the enteropathogenic bacteria or in the incidence of infection thereby or the alleviation of symptoms of infection, may be effected by employing an extended the treatment period. The actual duration of treatment may vary with the desired level of control, the subject animal and its physiological condition, and the dosage level, and may be readily determined by the practitioner skilled in the art.

The prebiotic oligosaccharides are administered in an amount effective to promote the growth of beneficial bacteria and thereby substantially inhibit the colonization of the treated animal by the enteropathogenic bacteria. In practice, an effective amount is therefore defined herein as that amount which will significantly reduce or eliminate the population(s) of the target enteropathogenic bacteria, and/or reduce the incidence of infection by these bacteria, in a treated animal in comparison to an untreated control animal. A reduction of incidence of infection may be demonstrated by one or more of a significant reduction in the number of animals infected with the target enteropathogen, a reduction in the severity or pathogenicity of infection, a reduction in the shedding of the target enteropathogen, or a reduction in the average concentration of the target enteropathogen, all in comparison with untreated control animals. Suitable amounts may be readily determined by the practitioner skilled in the art, and will vary with the mode of application, the specific subject animal, its age, size, and physiological condition, and with the duration of treatment. Without being limited thereto, suitable doses of the prebiotic oligosaccharides are typically greater than or equal to about 0.005 g/day/kg and less than about 5 g/day/kg of body weight of the treated animal, most preferably greater than about 0.01 g/day/kg and less than about 1 g/day/kg of body weight of the animal.

Although pure or substantially pure prebiotic oligosaccharides may be administered to the animals directly, in an optional yet preferred embodiment they are provided in the animal's feed or water. Alternatively, the compounds may be further formulated with a conventional inert carrier or pharmaceutically acceptable carrier to facilitate administration. For example, without being limited thereto, all or a portion of the compounds may be encapsulated using techniques conventional in the art, including but not limited to encapsulation in alginate gels. The compounds may also be formulated with lactose or skim milk, or combined with a small amount of feed or water for use as a premix. Adjuvants conventional in the art for the treatment of the animals, including those for the treatment of enteropathogens, may also be formulated with the compounds. Suitable adjuvants include but are not limited to probiotics, vaccines, antitoxins, deworming agents, or therapeutic antibiotics. Non-therapeutic levels of antibiotics may also be administered to the animals as is conventional in the art.

The following examples are intended only to further illustrate the invention and are not intended to limit the scope of the invention which is defined by the claims.

EXAMPLES

The preparation of oligosaccharides from a number of acceptors, their isolation and structural identification, and prebiotic activity were examined.

Alternansucrase

The alternansucrase preparation used in these experiments was isolated from *Leuconostoc mesenteroides* NRRL B-21297, a proprietary strain that secretes alternansucrase at enhanced levels, and does not produce dextransucrase (14–15). Bacteria were grown at 28° C. in a stirred, 10-liter batch fermentor in the medium previously described (Côté et al., *J. Ind. Microbiol. Biotechnol.* 1999, 23:656–660). After inoculation of 9.5 L medium with 0.5 L of 24-hour culture, the contents were agitated at 150 rpm, with aeration at 0.4 L/min. The pH was maintained at 5.5 by addition of 1M NaOH. Bacterial cells were removed after 24 hours by centrifugation at 16,000×g for 20 minutes. The culture fluid was concentrated by tangential flow ultrafiltration over 100,000 MW cutoff membranes, and subsequently diafiltered over the same membranes against 20 mM pH 5.4 sodium acetate buffer containing 0.01% (w/v) sodium azide. The 10-fold concentrated and dialyzed culture fluid was used as alternansucrase without further purification, and contained 1.5 units/mL when measured radiometrically for alternan-synthetase activity (Côté and Robyt, *Carbohydr. Res.*, 1982, 111:127–142).

Carbohydrates

Carbohydrates were purchased from Sigma Co. (St. Louis, Mo., USA) except for the following: L-fucose, L-rhamnose, raffinose, 3-O-β-D-galactopyranosyl-D-arabinose, 2-deoxy-D-galactose, D-arabinose, L-glucose, D-psicose, N-acetyl-D-mannosamine, α-methyl-D-galactopyranoside, and β-methyl-D-galactopyranoside (Pfanstiehl Laboratories, Waukegan, Ill., USA), planteose, gentianose, and stachyose (Fluka AG), L-arabinose and melibiose (Fisher Scientific), β-octyl-D-glucopyranoside (Pierce Chemicals, Rockford, Ill.), β-dodecyl maltoside (Calbiochem Co., San Diego, Calif.), melezitose (General Biochemicals, Chagrin Falls, Ohio, USA), turanose (Nutritional Biochemical Co., Cleveland, Ohio, USA), lactulose (Applied Science Labs., State College, Pa., USA), D-tagatose (P-L Biochemicals, Milwaukee, Wis., USA), lactose (Difco Co., Detroit, Mich., USA), maltitol (Towa Chem. Ind., Tokyo, Japan), xylsucrose (a gift from Ensuiko Sugar Co., Yokohama, Japan), theanderose (purchased from Wako Pure Chemicals and purified as previously described (Côté and Ahlgren, *Carbohydr. Res.*, 2001, 332:373–379)), and kojibiose, kojitriose, 6-O-α-D-glucopyranosyl-α, α-trehalose and 6,6'-di-O-α-D-glucopyranosyl-α,α-trehalose (gifts from Hayashibara Biochemical Co., Okayama, Japan). Leucrose, cycloalternan, and the alternan trimer 3-O-α-D-glucopyranosyl-6-O-α-D-glucopyranosyl-D-glucose were prepared as previously described (Côté and Ahlgren, *Carbohydr. Res.*, 2001, 332:373–379). NEOSUGAR™, a fructooligosaccharide mixture, was a gift from Meiji, Ltd., Saitama, Japan.

Analytical Methods

Carbohydrate mixtures were analyzed by thin-layer chromatography (TLC) as previously described (Côté and Robyt, *Carbohydr. Res.*, 1982, 111:127–142). Preparative HPLC was performed at room temperature using a C-18 column with water as the eluent. Detection was by either refractive index or optical rotation. Oligosaccharides were separated by size using a Bio-Gel P-2 (fine mesh) column (5×150 cm), eluted with water under gravity flow. Detection was by TLC. Nonreducing products such as sugar alcohols and methyl glycosides were separated by ion-exchange chromatography over Dowex 1X4-200 mesh anion exchange resin in the hydroxyl form, using water as the eluent. Structural analyses of oligosaccharides were carried out by methylation and NMR as previously described (Côté and Biely, *Eur. J. Biochem.*, 1994, 226:641–648). Total carbohydrate content was measured by the phenol-$H_2SO_4$ method (DuBois et al., *Anal. Chem.*, 1956, 28:350–356), and reducing sugar concentrations were determined by an automated alkaline ferricyanide technique (Robyt et al., *Anal. Biochem.*, 1972, 45:517–524).

Acceptor Reaction Conditions

Acceptor reactions were carried out at room temperature in 20 mM pH 5.4 sodium acetate buffer containing 0.01% sodium azide. For quantitative comparisons, reaction mixtures contained 45 μL of 10% (w/v) sucrose, 45 μL of 10% (w/v) acceptor sugar, and 10 μL of alternansucrase solution. Reactions were monitored by TLC, and were judged to be complete when all of the sucrose had been consumed. Upon completion of the reaction, each was mixed with 0.1 mL of ethanol, and the alternan thus precipitated was pelleted by centrifugation. The alternan pellets were redissolved in 0.3 mL water, reprecipitated with 0.5 mL ethanol, and redissolved in 1 mL water. These aqueous solutions were analyzed for total carbohydrate content. Several samples were also analyzed by densitometry of the thin-layer plates, and it was found that those results correlated well with measurements of alternan formation as an indication of relative acceptor strengths. This is in agreement with the findings of Robyt and Eklund (Robyt and Eklund, *Carbohydr. Res.*, 1983, 121:279–286) that oligosaccharide formation is inversely proportional to glucan formation once all sucrose has been consumed.

Bacterial Cultures

All bacterial cultures were obtained from the American Type Culture Collection (ATCC, Manassas, Va.) and included *Bacteroides thetaiotaomicron* ATCC 29148, *Bifidobacterium adolescentis* ATCC 15703, *Bifidobacterium breve* ATCC 15698, *Bifidobacterium infantis* ATCC 15697, *Bifidobacterium longum* ATCC 15707, *Bifidobacterium pseudocatenulatum* ATCC 27919, *Clostridium perfringens* ATCC 13124, *Enterobacter aerogenes* ATCC 35028, *Escherichia coli* ATCC 8739, *Lactobacillus acidophilus* ATCC 4356, *Lactobacillus casei* ATCC 393, *Lactobacillus rhamnosus* GG ATCC 53103, and *Salmonella choleraesuis* (*typhimurium*) ATCC 14028.

Culture Media and Growth Conditions

*B. thetaiotamicron* was grown on a defined medium (Djouzi et al., *J. Appl. Bacteriol.*, 1995, 79:117–127), *Bifidobacterium* species were grown on DSM 58 medium (Marx et al., *FEMS Microbiol. Lett.*, 2000, 182:163–169), *C. perfringens* was grown on TGY medium (Ionesco et al., *Ann. Inst. Pasteur* (Paris), 1976, 127B:283–294), *E. aerogenes*, *E. coli*, and *S. choleraesuis* were grown on a modified defined medium (Edberg and Edberg, Yale *J. Biol. Med.*, 1988, 61:389–399), and *Lactobacillus* species were grown on MRS (DeMan et al., *J. Appl. Bacteriol.*, 1960, 23:130–135) medium.

For carbohydrate utilization tests, various oligosaccharide preparations were added to each medium as the sole carbohydrate source at a concentration of 0.5%. Media were then filter-sterilized using a 0.2 µm membrane (Fisherbrand, Fisher Scientific) and added to sterilized 16 mm screw-cap test tubes to a volume of 9.75 ml. Oxygen was removed by adding Oxyrase to each test medium according to manufacturers instructions (Oxyrase, Inc., Mansfield, Ohio). Inocula for the test media were prepared by cultivating each microorganism for 24–48 hrs in the appropriate medium containing 0.5% glucose as the sole carbohydrate source. Each test medium was then inoculated with 0.25 ml of the 24–48 hr cultures. Test media containing no carbohydrate were also inoculated with each microorganism as a control to account for glucose carry-over. Following inoculation of the test media, cultures were incubated anaerobically for up to 4 days at 37° C. Anaerobic conditions were established using the Gas Pak system (Becton Dickinson Microbiology Systems, Sparks, Md.).

Carbohydrate Utilization

Each bacterial species was tested for its ability to utilize the maltose, melibiose, and raffinose acceptor products. Carbohydrate utilization was determined by measuring growth (Abs. at 600 nm, DU-64 Spectrophotometer, Beckman, Schaumburg, Ill.) and acid production (pH meter, Corning, N.Y., N.Y.) from each organism following the incubation period. Each carbohydrate utilization test was performed in triplicate.

Results and Discussion

Comparison of Acceptors

The results of quantitative comparisons of relative acceptor strengths are shown in Table I. Some general observations may be made. The best acceptors tended to be α-linked di- or trisaccharides of D-glucose, or in the case of maltitol, the reduced analogue thereof. Except for gentiobiose, the β-linked glucodisaccharides were less reactive. This suggests some degree of steric hindrance may exist in the β-linked disaccharides, which is alleviated by the extra degree of rotational freedom of the β-(1→6) linkage. Why gentiobiose is a better acceptor than isomaltose is a mystery. Monosaccharide sugar alcohols were very poor acceptors, with barely detectable levels of acceptor products observed on TLC. α,α-Trehalose was not an acceptor, despite the fact that it contains two α-linked D-glucopyranosyl units. Its derivatives, 6-O-α-D-glucopyranosyl-α,α-trehalose and 6,6'-di-O-α-D-glucopyranosyl-α,α-trehalose, were both relatively good acceptors.

The products of alternansucrase acceptor reactions with several glucodisaccharides have been described previously (Castillo et al., *Ann. NY Acad. Sci.*, 1992, 672:425–430; Côté and Robyt, *Carbohydr. Res.*, 1982, 111:127–142; Pelenc et al., *Sciences des Aliments*, 1991, 11:465–476; and Argüello-Morales et al., *Carbohydr. Res.*, 2001, 331:403–411). It has been noted that α-(1→6) linkages were usually formed first, but if an α-(1→6) linkage was already present, then either an α-(1→6) or an α-(1→3) linkage was formed (Côté and Robyt, *Carbohydr. Res.*, 1982, 111:127–142). The β-linked disaccharide cellobiose presents a somewhat different picture. In that instance, two different products were initially formed. One was the result of the formation of an α-(1→6) linkage to the D-glucosyl unit at the nonreducing end of the disaccharide, and the other arose from the formation of an α-(1→2) linkage to the reducing-end glucosyl unit (Argüello-Morales et al., *Carbohydr. Res.*, 2001, 331:403–411). Only the latter compound has been isolated from dextransucrase acceptor reactions with cellobiose (10, 27 Yamauchi and Ohwada, *Agric. Biol. Chem.*, 1969, 33:1295–1300; and Bailey et al., *J. Chem. Soc.*, 1958, 1895–1902). Higher DP oligosaccharides were also formed by subsequent glucosylations.

Maltitol Product

We found maltitol, like maltose, to be an excellent acceptor for alternansucrase. Not surprisingly, the initial product is panitol, analogous to the formation of panose from maltose (Côté and Robyt, *Carbohydr. Res.*, 1982, 111: 127–142). Higher DP products were also formed, but have not yet been isolated.

Gentiobiose Acceptor Product

Gentiobiose was a surprisingly good acceptor for alternansucrase. When tested under identical conditions, it was even better than isomaltose (Table I). Only a single initial product was formed, which proved to be α-D-glucopyranosyl-(1→6)-β-D-glucopyranosyl-(1→6)-D-glucose. Higher DP products were formed by subsequent glucosylations, but have not yet been identified. When the acceptor reaction conditions were such that the initial sucrose concentration was 6% (w/v) and the initial gentiobiose concentration was 3%, the total yield of trisaccharide was 72% based on gentiobiose, and the total oligosaccharide yield up to DP 5 was 88% based on gentiobiose. Only maltose, maltitol, nigerose, and α-methyl-D-glucopyranoside were better acceptors for alternansucrase. Gentiobiose is of interest as a food additive and prebiotic, but has a bitter taste. Glucosylation by alternansucrase may result in a less bitter product that would be more palatable in certain food applications.

Products from α-D-Galactopyranosides

Both melibiose and raffinose were relatively good acceptors. Compared with *L. mesenteroides* NRRL B-512F dextransucrase under identical conditions, the acceptor product yields with alternansucrase were much higher as determined by the size and intensity of product spots on TLC analysis (data not shown). Acceptor products from melibiose, raffinose and α-methyl-D-galactopyranoside were isolated and characterized by methylation analysis and NMR.

Alternansucrase gave two products by acceptor reaction with α-methyl-D-galactopyranoside. These were separated by ion-exchange chromatography. Methylation and NMR analysis showed these products to be α-D-glucopyranosyl-(1→4)-α-methyl-D-galactopyranoside (Liotta et al., *Carbohydr. Res.*, 2001, 331:247–253) and α-D-glucopyranosyl-(1→3)-α-methyl-D-galactopyranoside (Kochetkov et al., *Tetrahedron*, 1980, 36:1227–1230) in a molar ratio of approximately 2.5:1. By comparison, the only product reported to be synthesized by B-512F dextransucrase is α-D-glucopyranosyl-(1→4)-α-methyl-D-galactopyranoside (Fu et al., *Arch. Biochem. Biophys.*, 1990, 276:460–465).

When the alternansucrase acceptor reaction with melibiose was analyzed by TLC, only a single initial product was observed on TLC. This product was isolated by gel filtration chromatography and analyzed by NMR and methylation. It was found to be α-D-glucopyranosyl-(1→3)-α-D-galactopyranosyl-(1→6)-D-glucose, although trace contaminants in the GC-MS of the methylation products and minor NMR peaks suggested the presence of α-D-glucopyranosyl-(1→4)-α-D-galactopyranosyl-(1→6)-D-glucose as a minor product (<10%). Melibiose has been reported to be an acceptor for B-512F dextransucrase (Koepsell et al., *J. Biol. Chem.*, 1953, 200:793–801), but the structure of the product has, to the best of our knowledge, never been reported. We isolated the melibiose acceptor product from B-512F dextransucrase and analyzed it by NMR and methylation. The results indicate that dextransucrase synthesizes α-D-glucopyranosyl-(→4)-α-D-galactopyranosyl-(1→6)-D-glucose from melibiose, which is analogous to the acceptor product arising from α-methyl-D-galactopyranoside (Fu et al., *Arch. Biochem. Biophys.*, 1990, 276:460–465).

Raffinose proved to be an interesting acceptor for alternansucrase. Raffinose itself is of somewhat limited solubility in water. We discovered that it is possible to react sucrose solutions with a saturated slurry of raffinose in the presence of alternansucrase. As the enzyme glucosylates raffinose, the product is solubilized to a greater extent than the raffinose, so that eventually nearly all of the raffinose becomes solubilized via glucosylation. Two initial acceptor products were formed and were separated by preparative HPLC. Methylation and NMR showed these to be α-D-glucopyranosyl-(1→4)-α-D-galactopyranosyl-(1→6)-α-D-glucopyranosyl-(1⇌2)-β-D-fructofuranoside and α-D-glucopyranosyl-(1→3)-α-D-galactopyranosyl-(1→6)-α-D-glucopyranosyl-(1⇌2)-β-D-fructofuranoside in a 9:1 molar ratio. Thus, we find that in each case, α-D-galactopyranosides are glucosylated at both positions 3 and 4 by alternansucrase, with the relative ratio being variable. Interestingly, the dextransucrase acceptor product arising from raffinose is reported to be glucosylated at position 2 of the α-D-glucopyranosyl residue (Neely, *Arch. Biochem. Biophys.*, 1959, 79:54–161).

Fructose-Containing Products

Whenever sucrose serves as the substrate for glucansucrases, fructose is released. Fructose acts as an acceptor, giving rise mainly to leucrose (11, 33 Côté and Robyt, *Carbohydr. Res.*, 1982, 111:127–142; Stodola et al, *J. Am. Chem. Soc.*, 1952, 74:3202). It has been stated that leucrose is a poor acceptor for dextransucrase (Robyt and Walseth, Carbohydr. Res., 1978, 61:433–445) and alternansucrase (Côté and Robyt, *Carbohydr. Res.*, 1982, 111:127–142). This was based on the absence of higher DP products in reactions of the enzyme with sucrose alone. In such cases, leucrose formation is relatively low, usually less than 10% (Robyt and Eklund, *Carbohydr. Res.*, 1983, 121:279–286; and Côté and Robyt, *Carbohydr. Res.*, 1982, 111:127–142). At the early stages of reaction, fructose concentrations are relatively low, so leucrose concentrations would not build up to significant levels until later in the reaction. However, when leucrose was added as an acceptor at the same initial level as other disaccharides we tested, we observed a number of acceptor products on TLC. This is reflected in Table I, where leucrose resulted in a 19% reduction in the amount of alternan formed, presumably correlating to the diversion of 19% of glucosyl residues into oligosaccharide synthesis. Palatinose (isomaltulose), which is another acceptor product formed from fructose (Sharpe et al., *J. Org. Chem.*, 1960, 25:1062–1063), also serves as an acceptor for alternansucrase (Table I). In fact, it is even better than leucrose, yielding the same amount of product as raffinose or cellobiose. The products arising from leucrose and palatinose have not been structurally characterized.

Other Products

Other interesting acceptors include α-methyl-D-mannopyranoside and lactose. α-Methyl-D-mannopyranoside gave rise mainly to α-D-glucopyranosyl-(1→6)-α-methyl-D-mannopyranoside. Other, minor products, were also formed, and are currently under study. Lactose, however, presents a much more complicated picture. It was found to yield a mixture of products which have proven difficult to separate completely. Methylation analysis suggests the presence of α-D-glucopyranosyl-(1→2) linkages to both the D-glucopyranosyl and D-galactopyranosyl moieties, but results are at this time too ambiguous to interpret with any degree of certainty.

Rates of Acceptor Reactions

Glucansucrases may be viewed as possessing two distinct activities, based on the two-step reaction they catalyze. They may be viewed as glucan-synthesizing enzymes, in which case the activity is measured by the rate of synthesis of polymeric D-glucan. They may also be viewed as sucrases, in which case the activity would be most accurately measured by the rate of disappearance of sucrose. Although measuring sucrose consumption is tedious, measuring the corresponding release of reducing sugar (mainly fructose) is simple. Under ideal conditions, the two methods should yield the same results. A problem arises, however, when acceptor sugars are added to the reaction mixture. Ignoring for the moment that most acceptors also happen to be reducing sugars, the main problem lies in the fact that acceptor reactions will divert glucosyl transfer away from glucan synthesis and into the formation of low-molecular weight oligosaccharides. A good acceptor will act as an inhibitor of glucan synthesis, and any assay that measures glucan synthesis will characterize acceptors as inhibitors (e.g., Tanriseven and Robyt, *Carbohydr. Res.*, 1992, 225: 321–329). However, when the rate of sucrose consumption or reducing sugar release is measured, the inhibition of glucan synthesis is not a factor.

We observed in many of our acceptor reactions that sucrose disappeared much more rapidly in the presence of good acceptors than when no acceptor was present. To demonstrate this phenomenon, we assayed alternansucrase in the presence and absence of two different nonreducing acceptors, measuring the rate of release of reducing sugar (i.e., fructose) as an indicator of sucrase activity. Since no detectable D-glucose is released in the reaction, it can be assumed that this reflects an accurate measurement of the total rate of glucosyl transfer activity, including both alternan and oligosaccharide synthesis.

FIG. 1 shows the rates of alternansucrase action in the absence and presence of two good acceptors, α-methyl-D-glucopyranoside and maltitol. In each case, the rate is drastically enhanced by the presence of acceptor. This does not necessarily conflict with the results of Tanriseven and Robyt (*Carbohydr. Res.*, 1992, 225:321–329), as different enzymes were used and the rates of different reactions were measured. In fact, their finding of a separate acceptor binding site suggests the possibility of allosteric interactions with acceptors. It may be concluded that some good acceptors accelerate the rate of glucosyl transfer by alternansucrase. This is a welcome advantage for the synthesis of acceptor products.

Prebiotic Activity of Oligosaccharide Mixtures

Some of the acceptor product mixtures were tested for their ability to support the growth of probiotic bacteria, as well as undesirable bacteria. Mixtures were tested, rather than pure products, since it is likely that the cheaper mixtures would be used in any commercial applications. The maltose acceptor product mixture contained products mainly in the DP 3–7 range. Melibiose products in the DP 2–4 range (approx. 90% DP 3), and raffinose products in the DP 3–5 range (approx. 90% DP 4) were also tested.

The results, shown in Table II, compare favorably with those of NEOSUGAR™, a commercial fructooligosaccharide mixture. The most notable result is that the alternansucrase acceptor products were more selective for *Bifidobacterium* spp., and did not support much growth of *Lactobacillus* spp. This may or may not be an advantage, depending on the intended application. The alternansucrase products from melibiose and raffinose were also better in the sense that they did not support growth of the gas-producing anaerobe *Clostridium perfringens*.

It is understood that the foregoing detailed description is given merely by way of illustration and that modifications and variations may be made therein without departing from the spirit and scope of the invention.

TABLE I

Comparison of Acceptor Strengths with Alternansucrase, as Measured by Relative Amount of Alternan Formed.

| Monomers | Alternan (Rel. %) | Di- & Oligomers | Alternan (Rel. %) |
|---|---|---|---|
| dulcitol | 101 | α,α-trehalose | 102 |
| mannitol | 100 | lactulose | 91 |
| myo-inositol | 99 | galactosyl-arabinose | 90 |
| D-arabinose | 99 | melezitose | 90 |
| D-lyxose | 99 | cycloGlc$_4$ (cyclo-alternan) | 90 |
| xylitol | 97 | | |
| D-sorbose | 97 | stachyose | 89 |
| L-rhamnose | 96 | kojitriose | 86 |
| β-methyl-D-xyloside | 96 | β-dodecyl maltoside | 83 |
| β-methyl-D-galactoside | 94 | leucrose | 81 |
| L-fucose | 94 | sophorose | 80 |
| D-ribose | 93 | lactose | 79 |
| N-acetyl-D-mannosamine | 93 | planteose | 76 |
| L-lyxose | 92 | cellobiose | 72 |
| D-altrose | 92 | palatinose | 69 |
| D-mannose | 90 | raffinose | 67 |
| N-acetyl-D-glucosamine | 90 | gentianose | 66 |
| 2-deoxy-D-galactose | 89 | maltotriose | 65 |
| β-methyl-D-mannoside | 89 | laminaribiose | 58 |
| N-acetyl-D-galactosamine | 88 | turanose | 57 |
| | | 6-O-α-D-Glc-trehalose | 56 |
| L-sorbose | 88 | 6,6'-di-O-α-D-Glc-trehalose | 54 |
| D-xylose | 86 | | |
| D-psicose | 85 | isomaltotriose | 50 |
| D-galactose | 83 | melibiose | 45 |
| sorbitol | 82 | isomaltose | 44 |
| 2-deoxy-D-ribose | 81 | theanderose | 42 |
| D-fructose | 78 | 6''-O-α-D-Glc panose | 36 |
| D-talose | 77 | 3'-O-α-D-Glc | 31 |
| L-arabinose | 75 | isomaltose | |
| D-allose | 75 | kojibiose | 27 |
| α-methyl-D-galactoside | 73 | panose | 25 |
| α-methyl-D-mannoside | 70 | gentiobiose | 25 |
| D-tagatose | 65 | nigerose | 23 |
| L-glucose | 63 | maltitol | 18 |
| D-quinovose | 61 | maltose | 11 |
| β-methyl-D-glucoside | 60 | | |
| 2-deoxy-D-glucose | 59 | | |
| D-glucose | 53 | | |
| β-octyl D-glucoside | 52 | | |
| α-methyl-D-glucoside | 20 | | |

TABLE 2

Growth summary of oligosaccharide utilization by colonic bacteria Updated Nov. 17, 2002

| Genus and Species | Glucose | Gentiobiose Acceptor | Maltitol Acceptor | Maltose Acceptor | Melibiose Acceptor | Raffinose Acceptor | Low Mass Alternan |
|---|---|---|---|---|---|---|---|
| *Bifidobacterium adolescentis* 15703* | +++ | +++ | +++ | +++ | +++ | +++ | − |
| *Bifidobacterium breve* 15698* | +++ | ++ | ++ | ++ | + | ++ | + |

TABLE 2-continued

Growth summary of oligosaccharide utilization by colonic bacteria Updated Nov. 17, 2002

| Genus and Species | Glucose | Gentiobiose Acceptor | Maltitol Acceptor | Maltose Acceptor | Melibiose Acceptor | Raffinose Acceptor | Low Mass Alternan |
|---|---|---|---|---|---|---|---|
| Bifidobacterium infantis 15697* | +++ | + | ++ | + | + | ++ | + |
| Bifidobacterium longum 15707* | +++ | + | + | +++ | + | + | − |
| Bifidobacterium pseudocatenulatum 27919* | +++ | +++ | ++ | +++ | +++ | +++ | ++ |
| Bifidobacterium thermophilum 25866 | +++ | ++ | ++ | ++ | + | ++ | NT |
| Bifidobacterium catenulatum 27539 | +++ | +++ | ++ | +++ | + | + | NT |
| Bifidobacterium gallicum 49850 | +++ | − | + | − | − | − | NT |
| Bifidobacterium bifidum 29521 | +++ | − | − | − | − | − | NT |
| Bifidobacterium ruminantium 4939 | +++ | − | − | +++ | + | + | NT |
| Bifidobacterium boum 27917 | +++ | ++ | ++ | ++ | + | + | NT |
| Bifidobacterium adolescentis 15704 | +++ | NTY | NTY | ++ | + | − | NT |
| Bifidobacterium adolescentis 15705 | +++ | NTY | NTY | ++ | + | ++ | NT |
| Bifidobacterium adolescentis 15706 | +++ | NTY | NTY | ++ | + | ++ | NT |
| Lactobacillus casei 393 | +++ | ++ | + | + | − | − | − |
| Lactobacillus acidophilus 4356 | +++ | − | − | − | − | − | − |
| Lactobacillus GG 53103 | +++ | − | − | − | − | − | − |
| Bacteroides thetaiotaomicron 29148 | ++ | + | + | − | + | − | ++ |
| Escherchia coli 8739 | +++ | − | − | − | − | − | − |
| Enterobacter aerogenes 35028 | +++ | NTY | NTY | − | − | − | − |
| Salmonella typhimurium 14028 | ++ | − | − | − | − | − | − |
| Clostridium perfringens 13124 | +++ | NTY | NTY | + | − | − | ++ |

+++ = OD600 nm ≥ 0.60, high growth;
++ = OD600 nm 0.31–0.59, medium growth;
+ = OD600 nm 0.10–0.30, low growth
− = OD600 nm < 0.10, no growth
Media contained 0.5% oligosaccharide preparation. Each culture was incubated anaerobically for 5 days at 37° C, using a 0.25% inoculum and 0.1 ml oxyrase per ml of growth medium.
NTY = Not tested yet,
NT = Will not test, used all substrate

We claim:

1. A method for promoting the growth of *Bifidobacterium* species or *Lactobacillus* species in an animal comprising orally administering to an animal with a composition comprising one or more first oligosaccharides in an amount effective to promote the growth of *Bifidobacterium* species or *Lactobacillus* species, wherein said first oligosaccharides are produced by an alternansucrase enzyme catalyzed reaction of sucrose with an acceptor oligosaccharide, and further wherein said acceptor oligosaccharide comprises one or more of gentiobiose, raffinose, melibiose, maltitol, theanderose, kojibiose, or glucosyl trehaloses, and said animal is selected from the group consisting of fowl, equine, porcine, and primates.

2. The method of claim 1 wherein said composition comprises a mixture of said first oligosaccharides produced by said alternansucrase enzyme catalyzed reaction.

3. The method of claim 2 wherein said mixture comprises a crude, substantially unpurified reaction product of said alternansucrase enzyme catalyzed reaction.

4. The method of claim 2 wherein said mixture comprises oligosaccharides which have a degree of polymerization greater than or equal to 3.

5. The method of claim 4 wherein said mixture comprises oligosaccharides which have a degree of polymerization of 3, 4, and 5.

6. The method of claim 4 wherein said mixture comprises oligosaccharides which have a degree of polymerization of 3, 4, 5, 6, and 7.

7. The method of claim 1 wherein said first oligosaccharides are produced by said alternansucrase enzyme catalyzed reaction of sucrose with an acceptor oligosaccharide, and said acceptor oligosaccharide comprises gentiobiose, raffinose, melibiose, or maltitol.

8. The method of claim 1 wherein said composition consists essentially of said one or more first oligosaccharides.

9. The method of claim 1 wherein said amount of said first oligosaccharides administered to said animal is greater than about 0.005 g/day/kg and less than about 5 g/day/kg of body weight of said animal.

10. The method of claim 9 wherein said amount of said first oligosaccharides administered to said animal is greater than about 0.01 g/day/kg and less than about 1 g/day/kg of body weight of said animal.

* * * * *